United States Patent
Perlman et al.

(10) Patent No.: US 7,558,829 B1
(45) Date of Patent: Jul. 7, 2009

(54) APPARATUS AND METHOD FOR FILTERING EMAIL USING DISPOSABLE EMAIL ADDRESSES

(75) Inventors: Stephen G. Perlman, Palo Alto, CA (US); Timothy S. Cotter, Sunnyvale, CA (US); Scott M. Foster, San Jose, CA (US)

(73) Assignee: Rearden, LLC, San Francisco, CA (US)

( * ) Notice: Subject to any disclaimer, the term of this patent is extended or adjusted under 35 U.S.C. 154(b) by 904 days.

(21) Appl. No.: 10/758,475

(22) Filed: Jan. 14, 2004

(51) Int. Cl.
*G06F 15/16* (2006.01)
(52) U.S. Cl. .................................... 709/206
(58) Field of Classification Search .............. 709/206, 709/245
See application file for complete search history.

(56) References Cited

U.S. PATENT DOCUMENTS

| | | | |
|---|---|---|---|
| 2002/0138581 A1* | 9/2002 | MacIntosh et al. | 709/206 |
| 2003/0149726 A1* | 8/2003 | Spear | 709/206 |
| 2004/0045031 A1* | 3/2004 | Gautier | 725/110 |
| 2004/0153512 A1* | 8/2004 | Friend | 709/206 |
| 2004/0205173 A1* | 10/2004 | Hall | 709/206 |

* cited by examiner

*Primary Examiner*—Dustin Nguyen
*Assistant Examiner*—Michael E Keefer
(74) *Attorney, Agent, or Firm*—Blakely, Sokoloff, Taylor & Zafman LLP

(57) ABSTRACT

A system and method are described for filtering unwanted email messages. One embodiment of the filtering method comprises defining a plurality of disposable email addresses, wherein each of the disposable email addresses is associated with a different Website and/or individual; and in response to detecting a particular Website being visited by an end user, automatically providing the user with one or more disposable email address options from which to select.

8 Claims, 2 Drawing Sheets

US 7,558,829 B1

APPARATUS AND METHOD FOR FILTERING EMAIL USING DISPOSABLE EMAIL ADDRESSES

BACKGROUND OF THE INVENTION

1. Field of the Invention

This invention relates generally to the field of data processing systems. More particularly, the invention relates to an improved apparatus and method for filtering email using disposable email addresses.

2. Description of the Related Art

Unsolicited commercial e-mail, or "spam" is used to advertise products or to broadcast some political or social commentary. Like computer viruses, spam has become a scourge on the Internet as hundreds of millions of unwanted email messages are transmitted daily to virtually every e-mail recipient coupled to the Internet. One of the primary reasons for the proliferation of spam is that it is an extremely effective, and inexpensive was to reach a very large number of people.

Internet service providers ("ISPs") have invested significant expenses and added an enormous number of servers to do nothing more than spam filtering. Various filtering techniques may be employed including simple comparisons of email headers to that of known spammers (e.g., email subject and/or FROM address), to complex, digital analyses of email messages (e.g., performing a checksum or a fuzzy logic comparison to known spam messages).

Despite the amount of time and effort spent to develop effective filtering techniques, a substantial amount of spam still makes it through to intended recipients. Accordingly, what is needed is an improved apparatus and method for filtering unwanted email messages.

SUMMARY OF THE INVENTION

A system and method are described for filtering unwanted email messages. One embodiment of the filtering method comprises defining a plurality of disposable email addresses, wherein each of the disposable email addresses is associated with a different Website and/or individual; and in response to detecting a particular Website being visited by an end user, automatically providing the user with one or more disposable email address options from which to select.

BRIEF DESCRIPTION OF THE DRAWINGS

A better understanding of the present invention can be obtained from the following detailed description in conjunction with the drawings, in which.

DETAILED DESCRIPTION OF PREFERRED EMBODIMENTS

An improved apparatus and method is described below for filtering email using disposable email addresses. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Embodiments of the Invention

Figure 1:
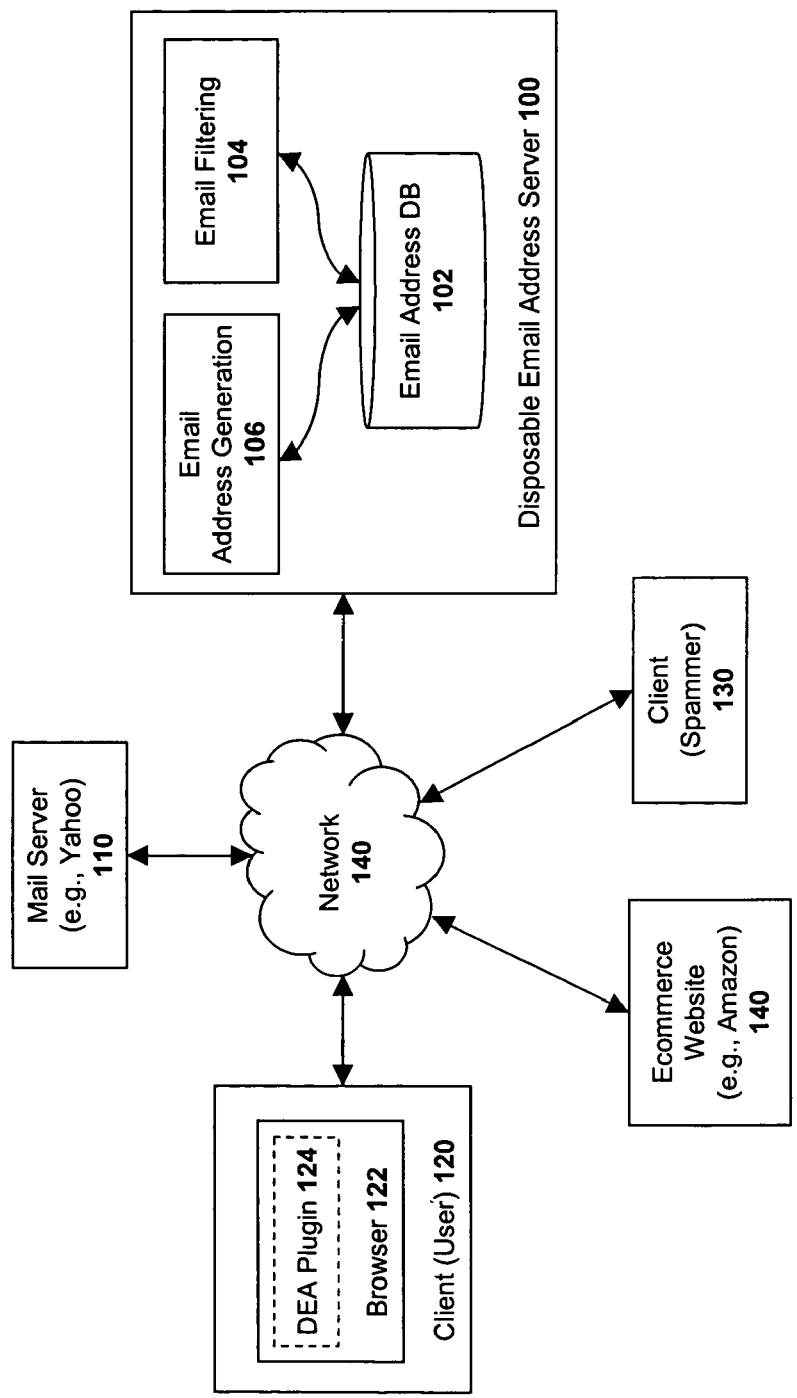
FIG. 1 illustrates a system for filtering email using disposable email messages according to one embodiment of the invention.

FIG. 1 illustrates one embodiment of the invention that filters spam using disposable email addresses. Specifically, this embodiment includes a disposable email address ("DEA") server 100 which acts as an email filtering agent between a client 120 and a mail server 110 on a network 140 (e.g., the Internet).

For the purpose of the following discussion, it is assumed that the user of client 120 has an email account on mail server 110 (hereinafter the user's "home" account) and that the user's email address on the home account is myaccount@home.com. The "home" account may be any type of email account including a Web account (e.g., Yahoo Mail, Hotmail) or a corporate email account protected by a firewall. To apply filtering to the user's home email account, in one embodiment, the user logs in to the DEA server 100 and establishes a separate "disposable" email account (or series of accounts). The disposable email account uses the following format: myaccount-extension@deamail.com, where "myaccount" represents the users "base" email name and "extension" represents an extension to the base email name (as described in greater detail below).

Figure 2:
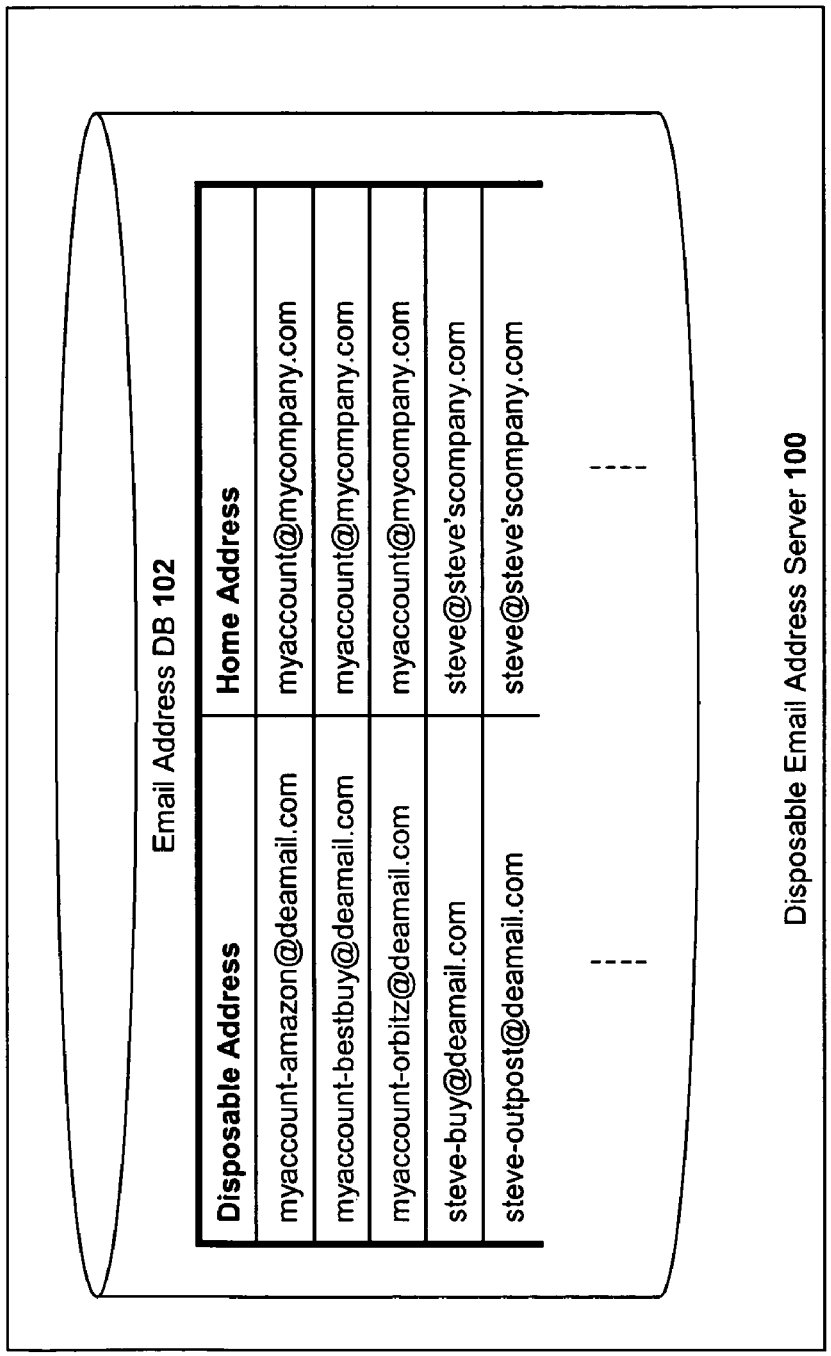
FIG. 2 illustrates an association between a user's "home" email address and the user's disposable email addresses.

In one embodiment, to initially establish an account on the DEA server 100, an end user specifies a base email name/address, and associates the base email name/address with his/her home email address. As illustrated in FIG. 2, an email address database 102 on the DEA server 100 maintains an ongoing association between each user's home email account (e.g., myaccount@home.com) and each user's DEA server 100 account (e.g., myaccount-extension@deamail.com).

In one embodiment, after the user establishes an account on the DEA server 100, the DEA server identifies any incoming email messages having the user's base address (e.g., "myaccount") as being addressed to the user, regardless of the extension used. For example, both the address myaccount-amazon@deamail.com and myaccount-bestbuy@deamail.com will be associated with the same user (identified by the "myaccount" base address). As such, the user may selectively provide disposable email addresses to different individuals and organizations, using a virtually unlimited number of different extensions. For example, when the user purchases an item from an e-commerce Website 140 such as Amazon.com®, the user may provide a DEA server email address with an extension that uniquely identifies the e-commerce Website (e.g., myaccount-amazon@deamail.com). Thus, if an e-commerce Website gives away the user's email address to a spammer, the user can easily identify the e-commerce site that gave away the address and can discard the old extension in place of a new extension (e.g., myaccount-amazon@deamail.com).

In one embodiment, using the association maintained in the email address database 102, the DEA 100 server forwards certain email messages from the user's DEA email account to the user's home email account 110 (so that the user can retrieve all of his/her email from a single mail server). Prior to transmission to the home account, email filtering logic 104 analyzes email messages according to a specified set of filtering rules. For example, the email filtering logic 104 may compare the source address or the subject field of incoming email messages to that of known spammers. The email filtering logic 104 may also perform a digital analysis such as a checksum comparison, or other types of logical comparisons (e.g., a fuzzy logic comparison). The user may also specify a "blacklist" which indicates specific email addresses from which he/she does not want to receive email. For example, if the user identifies a particular extension that was provided to spammers, the user can specify that the extension is no longer valid and/or that the filtering logic 104 should simply drop any email message containing that extension. Various other filtering techniques may be employed by the filtering logic 104 while still complying with the underlying principles of the invention.

The user may configure the email filtering module 104 in a variety of different ways. In one embodiment, the user configures the email filtering module 104 to forward any email messages having the user's base address except those on the user's blacklist. Alternatively, the user may configure the email filtering module 104 to filter all email messages, except those explicitly provided by the user—i.e., on a defined "white list" of base/extension combinations. In the latter embodiment, the user must inform the email filtering module each time the user creates a new extension; in the former embodiment, the user may generate new extensions at will, and only specify those extensions that the filtering module 104 should filter.

As mentioned above, in one embodiment, email which is not filtered by the filtering module is forwarded to the user's home mail server 110. To forward the message, the DEA server 100 enters the user's home email address in the destination field of the email message header (i.e., the "TO:" field). In addition, in one embodiment, the DEA server 100 appends the extension of the DEA address into the subject header of the email message. Returning to the previous example, if the user ordered a book from Amazon.com and the original email message subject was "Your Book Order," then the DEA server may imbed the "Amazon" extension within the subject of the email message as follows: "Amazon: Your Book Order." As a result, the user can readily determine the DEA address that was used to send the email message.

To alleviate the burden of managing a plurality of different disposable email addresses, one embodiment of the invention employs client-side and/or DEA server-side email address management logic. In the specific embodiment illustrated in FIG. 1, a DEA plugin 124 is installed on the user's Internet browser 122 to manage disposable email addresses. The DEA plugin 124 may be installed, for example, when the user registers with the DEA server 100. In one embodiment, the DEA plugin 124 maintains an up-to-date list of the current base-extension combinations selected by the end user (e.g., "myaccount-amazon," "myaccount-bestbuy," . . . etc). After a particular extension is recorded, the DEA plugin 124 may detect when user returns to a particular Website (e.g., based on the secondary domain name such as "amazon" within the amazon.com Web address), and automatically provide the user with the correct base-extension for that site. For example, when the user moves into the data entry field on the Amazon.com Website where the user's email address is required (e.g., to sign in to the Website), the DEA plugin 124 may automatically provide the correct base-extension email address by selecting a particular input sequence on his/her cursor control device such as, for example, a right-click on the user's mouse. In one embodiment, in response to the cursor control input sequence, the DEA plugin 124 generates a graphical list containing a plurality of email addresses from which to select.

In one embodiment, if the user has not previously entered an email address on a particular Website, the DEA plugin 124 will provide the user with an option to "automatically generate a new disposable email address" (e.g., within an action list generated in response to the cursor control input sequence). If the user selects this option, the DEA plugin 124 will automatically generate a new disposable email address for the Website on which the user is currently browsing. In one embodiment, the DEA plugin will automatically add the secondary domain name to the user's base address to generate the base-extension combination (e.g., "myaccount-amazon"). In response to the cursor control sequence, the user may also be provided with an option to "manually generate a new disposable email address." The user may use this option to manually select a new base-extension combination for the Website (or individual). In addition to the foregoing options, the user may also be provided with a complete list of all current disposable and/or home email addresses from which to select.

In one embodiment, the DEA plugin 124 communicates with the DEA server 100 at different stages of the email address selection process (e.g., each time a new disposable email address is created). For example, in one embodiment, once the user selects a new extension for a new Website, the DEA plugin automatically transmits an indication of the new extension to the DEA server 100, which stores the new extension within the email address database 100 (e.g., within the database table shown in FIG. 2). Thus, any time a new disposable address is created, it is automatically made available to the email filtering module, which may add it to the user's "white list," as described above.

The DEA server 100 may be configured to select new email addresses on behalf of the end user (rather than the DEA plugin 124). In this embodiment, email address generation logic 106 executed on the DEA server 100 automatically provides a new disposable email address to the DEA plugin 124 in response to a request from the DEA plugin 124 for a new disposable email address, and saves the new disposable email address within the email address database 102. As part of its request, the DEA plugin 124 may provide the address generation logic 106 with information relevant to address selection (e.g., such as the current secondary domain name of the Webpage on which the browser is positioned).

In one embodiment, after a user has instructed the DEA server to add a particular disposable email address to the user's blacklist (e.g., after detecting that the address has been provided to spammers), the DEA plugin 106 and/or the email address generation logic 106 will automatically provide the user with an alternative address upon detecting that the user is browsing the relevant Website. For example, if the initial address for Amazon.com was myaccount-amazon@deamail.com, then the DEA plugin 124 and/or the email address generation logic 106 may add a sequential number to the extension, resulting in myaccount-amazon@deamail.com. As described above, this option may be automatically provided to the user upon detecting that the user is browsing within an email address data field within the Amazon.com website. If the second address is subsequently provided to spammers, the DEA plugin 124 and/or the email address generation logic 106 may add another sequential number to the extension, resulting in the new disposable address myaccount-amazon3@deamail.com (and so on).

In one embodiment, rather than adding a sequential number, the DEA plugin 124 and/or the email address generation logic 106 adds a random number to the extension, potentially even the first time the user visits a website (e.g., myaccount-amazon264@deamail.com). As a result, if spammers determine a user's base address, they will be unable to get through simply by using common domains the user is likely to subscribe to (e.g. myaccount-amazon@deamail.com would be rejected, if "amazon264" was the correct extension).

As described above, the client 120 may communicate with the DEA server 100 via a browser 122 such as Internet Explorer® or Netscape Navigator®. In this embodiment, the DEA server is a Web server that communicates with the client 120 using the Hypertext Transport Protocol ("HTTP"). It should be noted, however, that the underlying principles of the invention are not limited to any particular type of communication protocol or any type of client-side or server-side software.

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention. Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Conversely, certain details of the system on which the invention is implemented have not been shown to avoid obscuring the principles of the invention. For example, each of the clients and servers illustrated in FIG. 1 may be implemented on well known general computing platforms such as an Intel Pentium 4 platform having 1 GByte or more of double data rate ("DDR") SDRAM memory and 80 GBytes or more of hard drive capacity. Similarly, the network 140 illustrated in FIG. 1 may be implemented using any suitable combination of Ethernet switches, TCP/IP gateways and/or routers, and associated physical layer cabling.

Accordingly, the scope and spirit of the present invention should be judged in terms of the claims which follow.

What is claimed is:

1. A method for filtering unwanted email messages comprising:

defining a plurality of disposable email addresses, wherein each of the disposable email addresses is associated with a different Website, the disposable email address comprising a base text string corresponding to a text string from a non-disposable email address of a user and an extension text string corresponding to a text string from a Website address; the disposable email address further being associated with the non-disposable email address of the user, the non-disposable email address identifying an email server on which the user has an active email account;

in response to detecting a particular Website being visited by an end user, automatically providing the user with a disposable email address currently associated with that particular Website, the disposable email address provided by a disposable email address server;

automatically entering the disposable email address within a data field on the Website upon selection of the data entry field with a cursor control device, the automatic entering of the disposable email address being performed by a browser plugin;

receiving an email message addressed to the disposable email address at a first server;

executing filtering logic to analyze the email message according to a specified set of filtering rules, wherein the filtering rules include comparing a source address or a subject field of the email message to that of known spammers; performing a checksum calculation on the incoming email message and comparing the checksum to that of known spammers; and comparing the email address of the email message to a white list of known non-spam addresses; and, in response to results of the analysis, either:

(a) forwarding the email message to the email server on which the user has an account by adding the user's non-disposable email address into the addressee field of the forwarded email message, and inserting the extension text string into a subject field of the email message, the extension text string usable to identify a source of the email message; or (b) filtering the email message and not forwarding the email message to the email server;

wherein, if a disposable email address is not already associated with the Website, providing an option to automatically generate a disposable email address for the Website;

automatically generating the disposable email address by combining an extension text string corresponding to a text string from the address of the Website to a base text string corresponding to a text string from a non-disposable email address;

subsequently receiving an indication from the user that any email messages directed to the disposable email address are to be filtered;

filtering any subsequent email messages directed to the disposable email address;

providing an option to automatically generate a new disposable email address for the Website; and automatically generating the new disposable email address by detecting a previous disposable email address for the Website; and adding a number to the end of the string related to the Website, the number distinguishing the new disposable email address from the previous disposable email address.

2. The method as in claim 1 wherein the secondary domain name of the Website is selected as the extension text string.

3. The method as in claim 1 further comprising:

adding a random number to the extension text string; and combining the random number and extension text string combination with the base text string.

4. The method as in claim 1 wherein the first server and the disposable email address server are the same server.

5. A system comprising:

a disposable email address ("DEA") server on which a plurality of disposable email addresses may be defined, wherein each of the disposable email addresses is associated with a different Website, the disposable email address comprising a base text string corresponding to a text string from a non-disposable email address of a user and an extension text string corresponding to a text string from a Website address, the disposable email address further being associated with the non-disposable email address of the user, the non-disposable email address identifying an email server on which the user has an active email account;

a DEA plugin communicatively coupled to the DEA server which, in response to detecting a particular Website being visited by an end user, automatically provides the user with a disposable email address currently associated with that particular Website and automatically enters the disposable email address within a data field on the Website upon selection of the data entry field with a cursor control device;

the DEA server receiving an email message addressed to the disposable email address at a first server; and executing filtering logic to analyze the email message according to a specified set of filtering rules, wherein the filtering rules include comparing a source address or a subject field of the email message to that of known spammers; performing a checksum calculation on the incoming email message and comparing the checksum to that of known spammers; and comparing the email address of the email message to a white list of known non-spam addresses; and, in response to results of the analysis, either:

(c) forwarding the email message to the email server on which the user has an account by adding the user's non-disposable email address into the addressee field of the forwarded email message, and inserting the extension text string into a subject field of the email message, the extension text string usable to identify the source of the email address; or (d) filtering the email message and not forwarding the email message to the email server;

wherein, if a disposable email address is not already associated with the Website, the DEA plugin providing an option to automatically generate a disposable email address for the Website;

the DEA server automatically generating the disposable email address by combining an extension text string corresponding to a text string from the address of the Website to a base text string corresponding to a text string from a non-disposable email address; subsequently receiving an indication from the user that any email messages directed to the disposable email address are to be filtered; filtering any subsequent email messages directed to the disposable email address;

the DEA plugin providing an option to automatically generate a new disposable email address for the Website; and the DEA server automatically generating the new disposable email address by detecting a previous disposable email address for the Website; and adding a number to the end of the string related to the Website, the number distinguishing the new disposable email address from the previous disposable email address.

6. The system as in claim 5 wherein the secondary domain name of the Website is selected as the extension text string.

7. The system as in claim 5 wherein the DEA server and/or the DEA plugin adds a random number to the extension text string, and combines the random number and extension text string combination with the base text string.

8. A system comprising:

a disposable email address ("DEA") server means on which a plurality of disposable email addresses may be defined, wherein each of the disposable email addresses is associated with a different Website, the disposable email address comprising a base text string corresponding to a text string from a non-disposable email address of a user and an extension text string corresponding to a text string from a Website address, the disposable email address further being associated with the non-disposable email address of the user, the non-disposable email address identifying an email server on which the user has an active email account;

a DEA plugin means communicatively coupled to the DEA server which, in response to detecting a particular Website being visited by an end user, automatically provides the user with a disposable email address currently associated with that particular Website and automatically enters the disposable email address within a data field on the Website upon selection of the data entry field with a cursor control device;

the DEA server means receiving an email message addressed to the disposable email address at a first server; and executing filtering logic to analyze the email message according to a specified set of filtering rules, wherein the filtering rules include comparing a source address or a subject field of the email message to that of known spammers; performing a checksum calculation on the incoming email message and comparing the checksum to that of known spammers; and comparing the email address of the email message to a white list of known non-spam addresses; and, in response to results of the analysis, either:

(e) forwarding the email message to the email server on which the user has an account by adding the user's non-disposable email address into the addressee field of the forwarded email message, and inserting the extension text string into a subject field of the email message, the extension text string usable to identify the source of the email address; or (f) filtering the email message and not forwarding the email message to the email server;

wherein, if a disposable email address is not already associated with the Website, the DEA plugin means providing an option to automatically generate a disposable email address for the Website;

the DEA server means automatically generating the disposable email address by combining an extension text string corresponding to a text string from the address of the Website to a base text string corresponding to a text string from a non-disposable email address; subsequently receiving an indication from the user that any email messages directed to the disposable email address are to be filtered; filtering any subsequent email messages directed to the disposable email address;

the DEA plugin means providing an option to automatically generate a new disposable email address for the Website; and the DEA server means automatically generating the new disposable email address by detecting a previous disposable email address for the Website; and adding a number to the end of the string related to the Website, the number distinguishing the new disposable email address from the previous disposable email address.

* * * * *